United States Patent
Billing et al.

(10) Patent No.: US 10,495,544 B1
(45) Date of Patent: Dec. 3, 2019

(54) FAILURE DETECTION DEVICE FOR DETECTING AN ISSUE WITH A PART OF A MACHINE

(71) Applicant: Caterpillar Inc., Deerfield, IL (US)

(72) Inventors: Andrew Billing, Bloomington, IL (US); Kurt Hopf, Houston, TX (US); David J. Lin, Peoria, IL (US); Michael Campagna, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/248,274

(22) Filed: Jan. 15, 2019

(51) Int. Cl.
G01M 15/00 (2006.01)
G01M 15/10 (2006.01)
G08B 21/18 (2006.01)
G01M 15/14 (2006.01)

(52) U.S. Cl.
CPC ............ G01M 15/00 (2013.01); G01M 15/10 (2013.01); G01M 15/14 (2013.01); G08B 21/182 (2013.01); G08B 21/187 (2013.01)

(58) Field of Classification Search
CPC .................................. G05B 1/00; G01N 1/00
See application file for complete search history.

(56) References Cited

U.S. PATENT DOCUMENTS

| 4,737,846 | A | 4/1988 | Tokuno et al. | |
|---|---|---|---|---|
| 7,174,237 | B2 | 2/2007 | Takayama et al. | |
| 7,672,811 | B2 * | 3/2010 | Xiao | G05B 23/0232 |
| | | | | 702/179 |
| 2010/0082197 | A1 * | 4/2010 | Kolbet | G05B 19/0428 |
| | | | | 701/31.4 |

* cited by examiner

Primary Examiner — Shirley Lu
(74) Attorney, Agent, or Firm — Harrity & Harrity LLP

(57) ABSTRACT

A failure detection device is disclosed. The failure detection device may receive operations data related to operations of a set of parts of a machine. The failure detection device may process the operations data using a condition-based processing technique. The condition-based processing technique may be associated with mapping initial values of data elements of the operations data to binary values based on satisfaction of a first set of conditions by the initial values. The failure detection device may detect a presence of a possible issue with the operations of the set of parts based on a second set of conditions, associated with the binary values and the initial values, being satisfied during a time period. The failure detection device may perform, after detecting the presence of the possible issue, a set of actions related to addressing the possible issue.

7 Claims, 5 Drawing Sheets

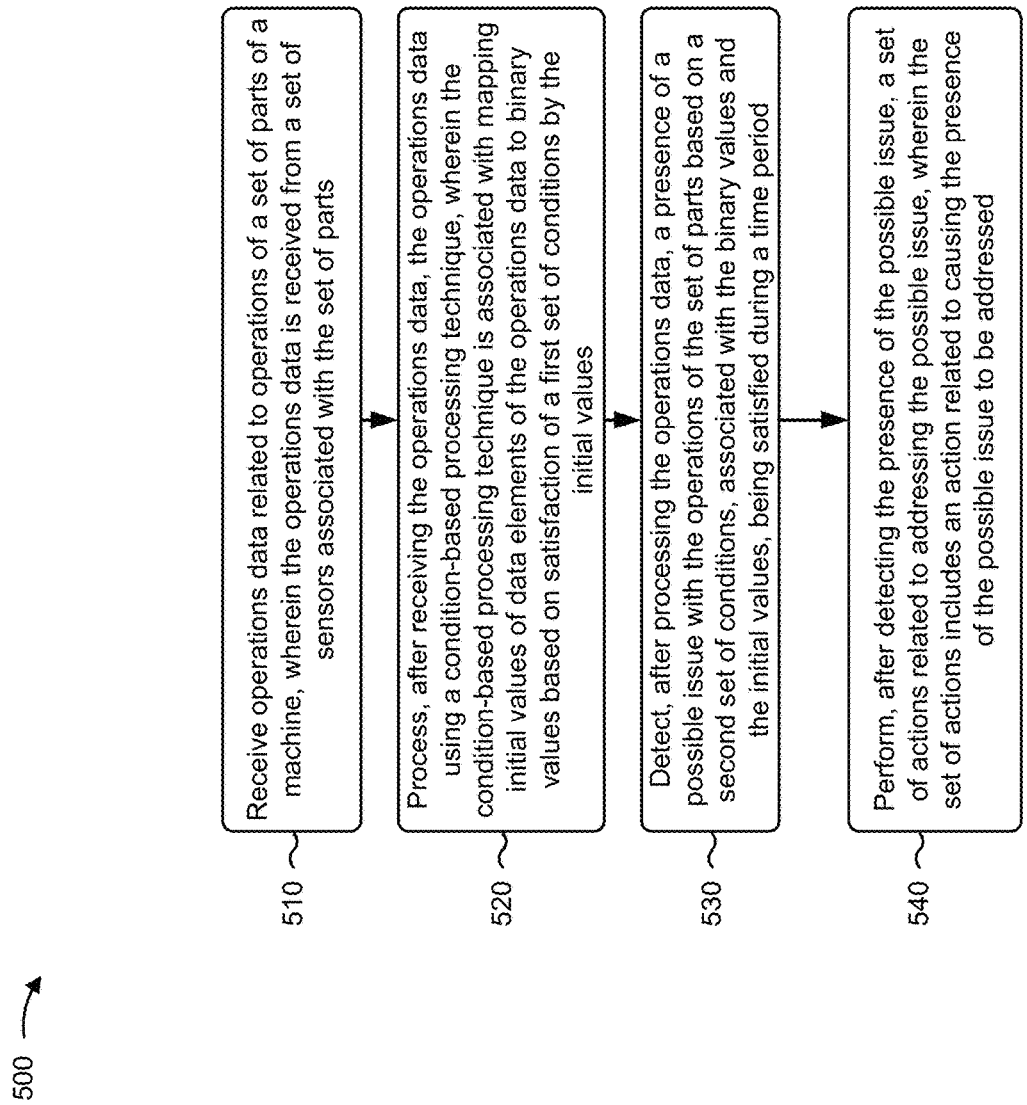

FAILURE DETECTION DEVICE FOR DETECTING AN ISSUE WITH A PART OF A MACHINE

TECHNICAL FIELD

The present disclosure relates generally to a failure detection device and, more particularly, to a failure detection device for detecting an issue with a part of a machine.

BACKGROUND

During operation of a machine, sensors gather operations data related to operations of various parts of the machine (e.g., spark plugs, turbine inlets, exhaust ports, and/or the like). For example, the sensors may gather voltage measurements for a spark plug, may gather temperature measurements for a turbine inlet and/or an exhaust port, and/or the like. The operations data is often noisy (e.g., due to interference in measurements by the sensors from operating conditions of the machine), inaccurate, and/or the like. Due to this, accurately identifying an issue associated with the operations of the parts is difficult, particularly when attempting to identify the issue during operation of the machine. Often issues are not identified until the issue significantly impacts the operation of the machine (e.g., by causing the machine to break down, to operate at significantly reduced performance than normal, and/or the like). This results in downtime for the machine, results in added costs via missed opportunities for relatively inexpensive preventative maintenance, and/or the like.

One attempt at intermittent fault detection and reasoning is disclosed in U.S. Patent Publication No. 20100082197 that published on Apr. 1, 2010 ("the '197 publication"). In the '197 publication a method for diagnostic reasoning of faults appearing in a vehicle health monitoring system (VHM) is provided. In the '197 publication, one of alternatively a signal mode or a failure mode state is identified based on an input. If a signal is identified, the signal is queried to determine if the signal indicts a failure mode. If the signal indicts the failure mode, an intermittent watch flag is set for the failure mode. A count representing a number of occurrences of the signal as an intermittent fault is incremented. It is determined if the count exceeds a predetermined threshold. If the count exceeds the predetermined threshold, the intermittent fault is determined to be a permanent fault.

However, the '197 publication does not account for detection of a variety of issues associated with operation of a machine that have occurred or are likely to occur, does not identify issues for preventative maintenance, and/or the like.

The failure detection device of the present disclosure solves one or more of the problems set forth above and/or other problems in the art.

SUMMARY

According to some implementations, the present disclosure is related to a method comprising: receiving, by a device, operations data related to operations of a set of parts of a machine, wherein the operations data is received from a set of sensors associated with the set of parts; processing, by the device and after receiving the operations data, the operations data using a condition-based processing technique, wherein the condition-based processing technique is associated with mapping initial values of data elements of the operations data to mapped values based on satisfaction of a set of conditions by the initial values; detecting, by the device and after processing the operations data, a presence of a possible issue with the operations of one or more of the set of parts based on a condition, associated with the mapped values, being satisfied a threshold quantity of times during a time period; triggering, by the device and based on detecting the presence of the possible issue, an alarm that indicates the presence of the possible issue with the operations of the one or more of the set of parts; and performing, by the device and based on triggering the alarm that indicates the presence of the possible issue, a set of actions related to addressing the possible issue.

According to some implementations, the present disclosure is related to a device associated with a machine that includes a set of spark plugs and a set of sensors associated with the set of spark plugs, the device comprising: a memory; and one or more processors configured to: receive operations data related to operations of the set of spark plugs, wherein the operations data is received from the set of sensors associated with the set of spark plugs; process, after receiving the operations data, the operations data using a pre-processing technique to form derived data, wherein the pre-processing technique is associated with reducing noise associated with the operations data; process, after processing the operations data, the derived data using a condition-based processing technique, wherein the condition-based processing technique is associated with assigning mapped values to data elements of the derived data based on whether initial values for the data elements satisfy a threshold; detect, after processing the derived data, a presence of a possible issue with the set of spark plugs based on a condition, associated with the mapped values, being satisfied a threshold quantity of times during a time period; and perform, after detecting the presence of the possible issue, a set of actions related to addressing the possible issue.

According to some implementations, the present disclosure is related to a failure detection device comprising: one or more memories; and one or more processors, communicatively coupled to the one or more memories, configured to: receive operations data related to operations of a set of parts of a machine, wherein the operations data is received from a set of sensors associated with the set of parts; process, after receiving the operations data, the operations data using a condition-based processing technique, wherein the condition-based processing technique is associated with mapping initial values of data elements of the operations data to binary values based on satisfaction of a first set of conditions by the initial values; detect, after processing the operations data, a presence of a possible issue with the operations of the set of parts based on a second set of conditions, associated with the binary values and the initial values, being satisfied during a time period; and perform, after detecting the presence of the possible issue, a set of actions related to addressing the possible issue, wherein the set of actions includes an action related to causing at least one of: the machine or the set of parts to be inspected, or the presence of the possible issue to be addressed.

BRIEF DESCRIPTION OF THE DRAWINGS

FIG. 5 is a flow chart of an example process for detecting an issue with a part of a machine.

DETAILED DESCRIPTION

This disclosure relates to a failure detection device. The failure detection device has universal applicability to any machine capable of utilizing such a failure detection device. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckle-boom loader, a material handler, a motor grader, a pipelayer, a road reclaimer, a skid steer loader, a skidder, a telehandler, a tractor, a dozer, a tractor scraper, or other above ground equipment, underground equipment, or marine equipment. Moreover, one or more implements may be connected to the machine and monitored and/or controlled by the failure detection device. A machine may be a mobile machine (e.g., a wheeled or tracked machine) or an immobile machine.

Figure 1:
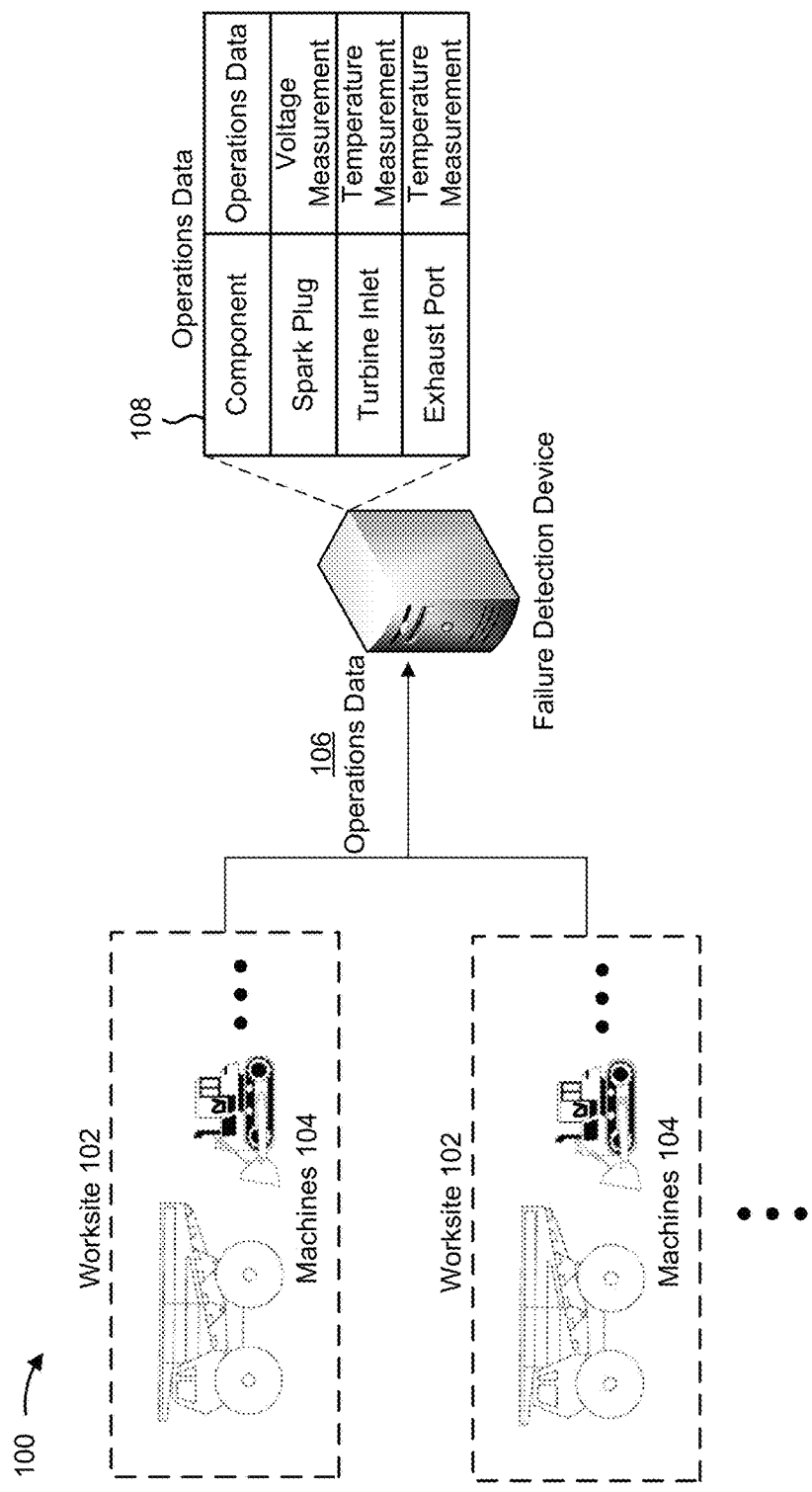
FIGS. 1-3 are diagrams of one or more example implementations described herein.
Figure 2:
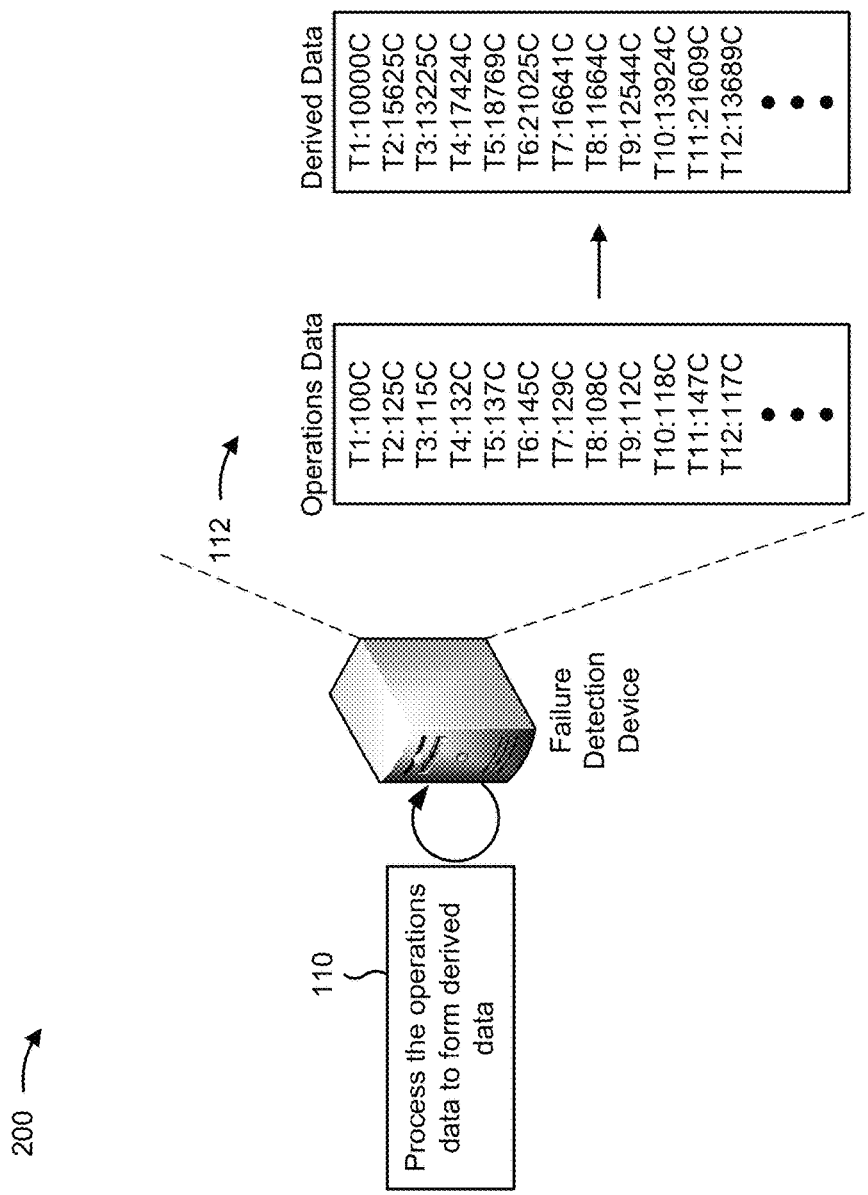
Figure 3:
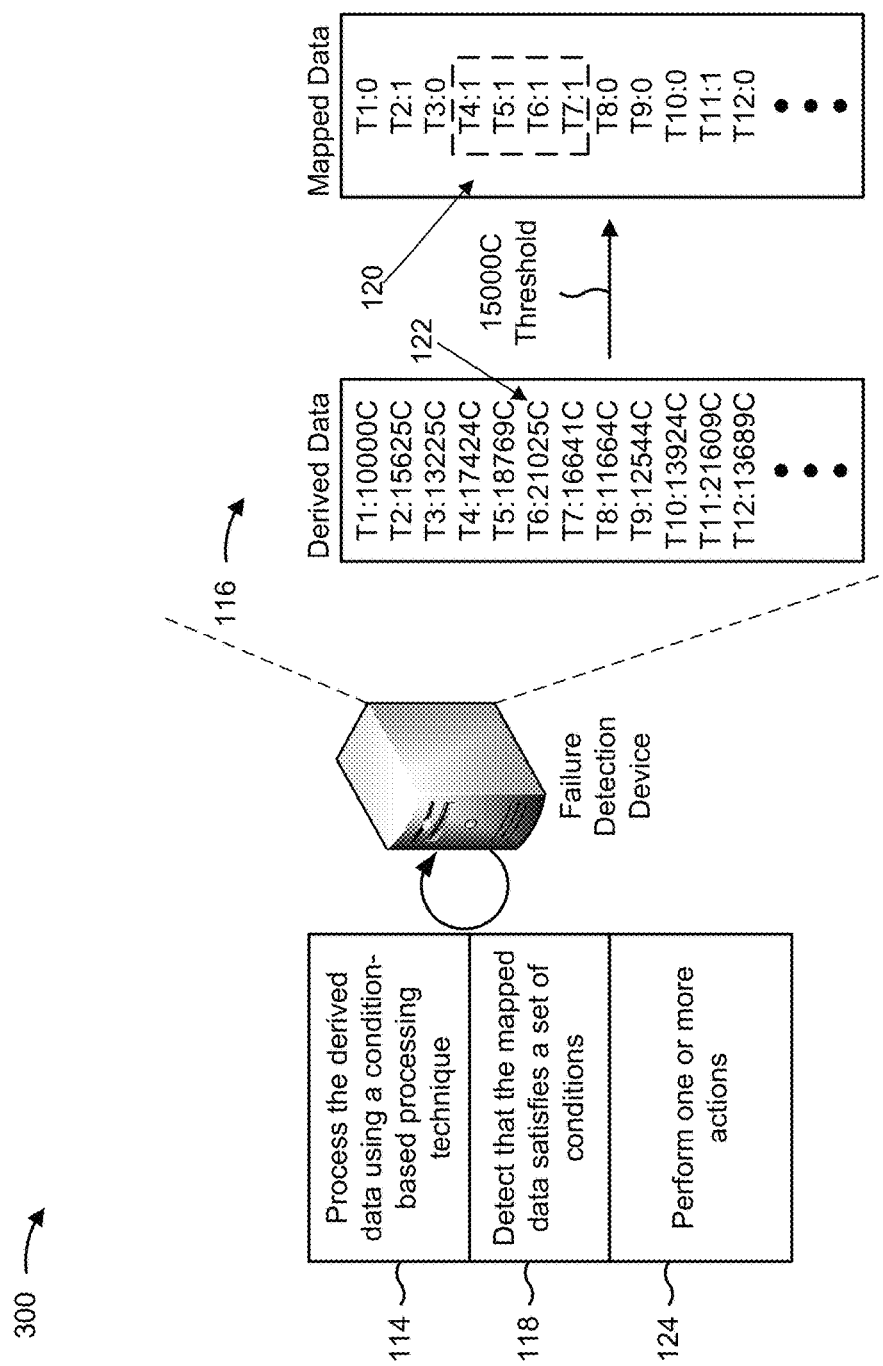

FIGS. 1-3 are diagrams 100-300 of one or more example implementations described herein. FIG. 1 shows various worksites 102 and a set of machines 104 at the various worksites 102. In some implementations, a worksite 102 may include a mine site, a logging site, a construction site, and/or the like. In some implementations, a failure detection device may be deployed to a worksite 102 (e.g., may be hosted on a server device at a control center at the worksite 102), may be remote from a worksite 102 (e.g., may be deployed on a server device of a data center), may be on-board machines 104, and/or the like. In some implementations, a worksite 102 may have various operating conditions, such as an air temperature, an altitude, a humidity level, a ground firmness, and/or the like. Different operating conditions may impact operations of a machine 104 in different manners, as described elsewhere herein.

As shown by reference number 106, the failure detection device may receive, from a set of machines 104 for a worksite 102, operations data. For example, the failure detection device may receive the operations data for a machine 104 in real-time during operation of the machine 104, at a scheduled time, periodically, based on requesting the operations data from the machine 104, and/or the like. In some implementations, the failure detection device may receive the operations data from a sensor installed on, or associated with, a part of a machine 104. For example, a machine 104 may include a set of sensors associated with various parts (e.g., spark plugs, turbine inlets, exhaust ports, and/or the like) of the machine 104. In some implementations, an on-board system may gather the operations data from the set of sensors, and may provide the operations data to the failure detection device, such as when the failure detection device is deployed remote from the machine 104. Alternatively, the failure detection device may receive the operations data directly from the set of sensors, such as when the failure detection device is deployed in association with an on-board system of a machine 104.

In some implementations, the operations data may be related to operations of a part of the machine. For example, the operations data may include sensor measurements related to the operations of the part. As specific examples, and as shown by reference number 108, the operations data may include voltage measurements for a spark plug, temperature measurements for a turbine inlet, temperature measurements for an exhaust port, and/or the like. In some implementations, the operations data may be time series data (e.g., may identify sensor measurements over time), may identify sensor measurements for a particular point in time, may identify average sensor measurements over time, and/or the like. In some implementations, the operations data for a machine 104 may include thousands, millions, or more data elements from multiple sensors associated with tens, dozens, or more parts (e.g., a same type of part or different types or parts). In some implementations, the failure detection device may receive operations data from dozens, hundreds, or more machines 104 at a worksite 102, may receive the operations data from tens, dozens, or more worksites 102, and/or the like.

In some implementations, the failure detection device may receive operating condition data that identifies a set of operating conditions at a worksite 102 in a manner similar to that described with regard to operations data. For example, the failure detection device may receive the operating condition data from a set of sensors associated with a machine 104, deployed at worksite 102, and/or the like.

Turning to FIG. 2, and as shown by reference number 110, the failure detection device may process the operations data to form derived data. For example, the failure detection device may process the operations data after receiving the operations data, based on receiving input from a user of the failure detection device to process the operations data, and/or the like.

In some implementations, the failure detection device may process the operations data using a pre-processing technique. For example, the pre-processing technique may be associated with reducing noise associated with the operations data. Continuing with the previous example, the pre-processing technique may be associated with modifying initial values of the operations data (e.g., an initial value of operations data may include a measurement gathered by a sensor) to reduce noise associated with the operations data. In some implementations, the failure detection device may apply a same value to initial values of data elements of the operations data, may modify the initial values of the data elements using a function, and/or the like, when processing the operations data using the pre-processing technique. For example, the failure detection device may increase the initial values by a uniform amount across data elements of the operations data to form derived data, may square the initial values of the operations data to form derived data, may apply a logarithmic or exponential function to the initial values to form derived data, may normalize the initial values to form derived data, and/or the like. Processing derived data, as described herein, may conserve processing resources relative to processing operations data by separating values of the operations data, thereby reducing or eliminating an effect of noise that is present in the operations data, providing a data set that is easier and/or faster for the failure detection device to process and/or analyze, and/or the like.

In some implementations, the failure detection device may determine to not process operations data to form derived data based on values of the operations data being within a threshold percentage of each other, based on a standard deviation of the operations data satisfying a threshold, and/or the like. This conserves processing resources of the failure detection device by reducing or eliminating a need for the failure detection device to process operations data in situations when the operations data is unlikely to include a significant amount of noise. In addition, this reduces an amount of time between the failure detection device receiving operations data and performing an action described herein, thereby minimizing an amount of time needed to address a possible issue (e.g., a possible failure, a threshold amount of wear and tear, a reduced operating life, conditions that could cause a failure or decreased performance, and/or the like) with operations of a part of a machine 104.

In some implementations, the failure detection device may determine, prior to processing operations data, that an engine of a machine 104 is operating. For example, if the failure detection device is to process operations data related to a part of the machine 104 that is associated with an engine of the machine 104 (e.g., as determined from metadata associated with the operations data, as determined from input to the failure detection device from a user of the failure detection device, and/or the like), then the failure detection device may monitor data from the machine 104 to determine whether the engine of the machine 104 is operating prior to processing operations data from a sensor, prior to requesting the sensor to provide operations data, and/or the like.

Reference number 112 shows an example of processing the operations data to form derived data. For example, the failure detection device may square the initial values of the operations data to form the derived data. As a specific example, the operations data for time T1, which is a measured temperature of 100 degrees Celsius (C) (shown as "100 C"), becomes 10000 degrees C. (shown as 10000 C) in the derived data. This improves a quality of the operations data prior to processing the operations data in the manner described herein by separating the initial values from each other so that the operations data can be more easily analyzed.

Turning to FIG. 3, and as shown by reference number 114, the failure detection device may process the derived data using a condition-based processing technique. For example, the failure detection device may process the derived data using the condition-based processing technique to form mapped data after forming the derived data, based on receiving input from a user of the failure detection device to process the derived data, after receiving the operations data (e.g., when derived data is not formed), after receiving the derived data, and/or the like.

In some implementations, the condition-based processing technique may be associated with mapping the initial values of data elements of the derived data (or operations data when the derived data is not formed) to mapped values based on satisfaction of a set of conditions by the initial values (e.g., an initial value of derived data may include an unmodified value of derived data prior to processing of the derived data). For example, the condition-based processing technique may include a binary-base processing technique, where the initial values are mapped to binary values based on satisfaction of the threshold (e.g., an initial value may be mapped to a 0 (zero) when the initial value fails to satisfy a threshold, or a 1 when the initial value satisfies the threshold), may include a ternary-based processing technique, where the initial values are mapped to ternary values based on satisfactions of multiple thresholds (e.g., an initial value may be mapped to a 0 when the initial value fails to satisfy a first threshold, a 1 when the initial value satisfies the first threshold but fails to satisfy a second threshold, and a 2 when the initial value satisfies the first threshold and the second threshold), and/or the like. In some implementations, and as described elsewhere herein, the failure detection device may detect possible issues with operations of a part of machine 104 based on a mapping of operations data to binary values, ternary values, and/or the like (e.g., a pattern, a quantity, and/or the like of binary vales, ternary values, and/or the like).

This conserves processing resources of the failure detection device relative to using operations data and/or derived data by transforming a data set to be used to detect a possible issue with operations of a part of a machine 104 from a larger range of discrete values to a smaller range of discrete values for ease of computation and analysis, for robustness and stability of the data set, to reduce noise in the data set, and/or the like. Further, processing a discrete data set using a set of conditions in the manner described herein, reduces false positive detection of possible issues with operations of a part of a machine 104, thereby conserving processing resources of the failure detection device that would otherwise be consumed via a false positive detection, reduces delay in detecting a possible issue, and/or the like.

Reference number 116 shows an example of processing the derived data using the condition-based processing technique. For example, the derived data is mapped to either a "0" or a "1" based on whether the derived data satisfies a 15000 C threshold. Continuing with the previous example, and for time T1, the derived data is mapped to "0" based on the initial value for the derived data, which is 10000 C, failing to satisfy the 15000 C threshold.

As shown by reference number 118, the failure detection device may detect that the mapped data satisfies a set of conditions. For example, the failure detection device may detect that the mapped data satisfies a set of conditions after processing the derived data using the condition-based processing technique, based on receiving input from a user of the failure detection device to process the mapped data to detect whether the mapped data satisfies a set of conditions, and/or the like.

In some implementations, the failure detection device may detect that the mapped data satisfies a condition when a quantity of particular values for mapped data satisfies a threshold, when the quantity satisfies the threshold during a time period (e.g., a day, a week, and/or the like), when the quantity satisfies the threshold in consecutive time periods, and/or the like. For example, and as shown by reference number 120, the failure detection device may detect that the particular values of the mapped data satisfy a condition when detecting four consecutive times (times T4 through T7) with 1 as a value of the mapped data.

Additionally, or alternatively, the failure detection device may detect that the mapped data satisfies a condition in a context of the initial values of the derived data. For example, the failure detection device may determine that a condition is satisfied when an initial value of the derived data satisfies a threshold. Continuing with the previous example, and as shown by reference number 122, the failure detection device may determine that a condition is satisfied when an initial value of the derived data (e.g., an initial value for time T6) satisfies a threshold (e.g., 20000 C) during a time period when a threshold quantity of the particular value occurs (e.g., during times T4 through T7). In this way, the failure detection device may combine an analysis of values of the mapped data and an analysis of the initial values of the derived data to detect that a set of conditions has been satisfied.

In some implementations, the failure detection device may detect satisfaction of different conditions for different parts of a machine 104. For example, for a spark plug, the failure detection device may detect satisfaction of a first condition when a particular value of mapped data (e.g., a value of 1 for binary data that represents that a voltage level of the spark plug satisfied a threshold) occurs for a threshold quantity of consecutive days, and may detect satisfaction of a second condition when an initial value for the derived data (or operations data when derived data is not generated) satisfies a threshold during the consecutive days.

Additionally, or alternatively, and as another example for a turbine inlet, the failure detection device may detect satisfaction of a first condition when a particular value of mapped data (e.g., a value of 1 for binary data that represents that a temperature of the turbine inlet satisfied a threshold) occurs a threshold quantity of times during a day, and may detect satisfaction of a second condition when an engine speed and/or a load of an engine associated with the same machine 104 as the turbine inlet satisfy corresponding thresholds. Additionally, or alternatively, and as another example for an exhaust port, the failure detection device may detect satisfaction of a first condition when a particular value of mapped data (e.g., a value of 1 for binary data that represents that a temperature of the exhaust port satisfied a threshold) occurs a threshold quantity of times during a day, and may detect satisfaction of a second condition when an engine speed and/or a load of an engine associated with the same machine 104 as the exhaust port satisfy corresponding thresholds.

In some implementations, the failure detection device may detect a presence of a possible issue with operations of one or more parts of machine 104 based on a condition being satisfied. For example, and with regard to the analysis shown by reference numbers 120 and 122, the failure detection device may detect that a first condition is satisfied by a particular value of mapped data appearing in a threshold quantity of consecutive time periods, and may detect that a second condition is satisfied by at least one initial value of the derived data satisfying a threshold during the consecutive time periods associated with the first condition. Continuing with the previous example, the failure detection device may detect a presence of a possible issue based on satisfaction of the first condition and/or of the second condition.

In some implementations, the failure detection device may process mapped data for multiple parts of the same type (e.g., multiple spark plugs, multiple turbine inlets, and/or multiple exhaust ports, and/or the like), and may identify particular parts associated with a possible issue. For example, the different parts of the same type may be associated with different sensors, and the failure detection device may process the mapped data for each of the different parts separately to identify a specific part associated with a possible issue. This provides the failure detection device with the capability to report a specific component to be addressed by a technician, thereby conserving costs and/or time associated with diagnostic testing of the multiple parts, reducing an amount of time needed to address the possible issue, and/or the like.

In some implementations, the failure detection device may determine a severity of a possible issue. For example, the failure detection device may determine a severity of a possible issue based on a combination of conditions that are satisfied, thresholds that are satisfied in association with the conditions, a pattern of operations data, a pattern of derived data, a pattern of mapped data, and/or the like. Continuing with the previous example, satisfaction of a particular combination of conditions, satisfaction of particular thresholds associated with the conditions, a particular pattern of operations data, derived data, and/or mapped data, and/or the like may be associated with a particular severity. In some implementations, the failure detection device may perform different actions, described below, based on a severity of a possible issue. For example, the failure detection device may perform a first set of actions for a low severity possible issue, a second set of actions for a medium severity possible issue, a third set of actions for a third severity possible issue, and/or the like.

In some implementations, the failure detection device may perform one or more of the analyses described herein in a context of operating conditions of a machine 104. For example, the failure detection device may detect a presence of a possible issue with operations of a part of a machine 104 based on a context of the operating conditions of the machine 104 to account for manners in which different operating conditions affect operations of parts of the machine 104. In some implementations, operating conditions may include an air temperature at a worksite 102, an altitude of a worksite 102, an age of a machine 104, a use of a machine 104, and/or the like, as indicated by operating condition data.

In some implementations, the failure detection device may perform an analysis in a context of operating conditions of a machine 104 by selecting a value for a threshold based on the operating conditions, by determining to perform or to not perform particular operations described herein based on the operating conditions, and/or the like. For example, the failure detection device may select a higher or a lower threshold for detecting a possible issue with operations of a part of a machine 104 based on a worksite 102 associated with the machine 104 being at a relatively higher altitude, having a threshold temperature, and/or the like.

Additionally, or alternatively, and as another example, the failure detection device may determine to generate or to not generate derived data and/or mapped data based on operating conditions of a worksite 102 associated with a machine 104. Continuing with the previous example, the failure detection device may determine to generate derived data from operations data and/or to generate mapped data from derived data when a machine 104 is associated with operating conditions that are likely to produce a larger amount of noise in operations data, such as when an age of the machine satisfies a threshold, when a temperature of a worksite 102 satisfies a threshold, and/or the like. In this way, the failure detection device can intelligently adapt detection of a possible issue with a part to different operating conditions, thereby improving an accuracy of detecting an issue with operations of a part of a machine 104. This conserves processing resources of the failure detection device via selective use of operating conditions data to selectively perform operations of the failure detection device.

In some implementations, when detecting a possible issue, the failure detection device may use a machine learning model that has been trained to detect a possible issue (e.g., an existing issue or an impending issue), a failure (e.g., an existing failure or an impending failure), and/or the like related to operation of a part of a machine 104, using a training set of data that includes different sets of operations data and information that identifies whether the operations data is indicative of a possible issue, a failure, a false positive detection of a possible issue and/or a failure, and/or the like. For example, the training set of data may include a first set of operations data and a first indication as to whether the first set of operations data is indicative of a possible issue, a failure, a false positive, and/or the like, a second set of operations data and a second indication as to whether the second set of operations data is indicative of a possible issue, a failure, a false positive, and/or the like, and so forth.

In some implementations, the training set of data may include historical operations data, information that identifies possible issues in the historical operations data, and/or the like. Additionally, or alternatively, when the failure detection device inputs the operations data into the machine learning model, the failure detection device may input a first portion of the operations data as a training set of data, a second portion of the operations data as a validation set of data, and a third portion of the operations data as a test set of data (e.g., to be used to determine a model included in the first set of models). In some implementations, the failure detection device may perform multiple iterations of training of the machine learning model, depending on an outcome of testing of the machine learning model (e.g., by submitting different portions of the operations data as the training set of data, the validation set of data, and the test set of data).

In some implementations, when training the machine learning model, the failure detection device may utilize a random forest classifier technique to train the machine learning model. For example, the failure detection device may utilize a random forest classifier technique to construct multiple decision trees during training and may output a classification of operations data. Additionally, or alternatively, when training the machine learning model, the failure detection device may utilize a gradient boost tree classifier technique to generate the machine learning model. For example, the failure detection device may utilize a gradient boost tree classifier technique to generate a prediction model from a set of weak prediction models (e.g., by generating the machine learning model in a stage-wise manner, by optimizing an arbitrary differentiable loss function, and/or the like). In some implementations, the failure detection device may use one or more other machine learning techniques in association with training the machine learning model.

In some implementations, rather than training a machine learning model, the failure detection device may receive a machine learning model from another device. For example, a server device may generate the machine learning model based on having trained the machine learning model in a manner similar to that described above (and/or by using historical operations data from multiple machines 104) and may provide the machine learning model to the failure detection device (e.g., may pre-load the failure detection device with the machine learning model, may receive a request from the failure detection device for the machine learning model, and/or the like).

In some implementations, the machine learning model may indicate whether a part associated with a machine 104 is experiencing a possible issue, whether the part has failed, whether the part is predicted to experience an issue in a period of time, whether the part is predicted to experience a failure in a period of time, an amount of wear and tear the part has experienced, a remaining useful life of the part, and/or the like. For example, the failure detection device may input real-time or near real-time operations data into the machine learning model to determine whether the part is experiencing a possible issue, whether the part has experienced a failure, whether the part is predicted to experience a possible issue in a period of time, whether the part is predicted to experience a failure in a period of time, a remaining useful life of the part, an amount of wear and tear the part has experienced, and/or the like based on the manner in which the machine learning model was trained.

For example, the machine learning model may output an indication of whether the part is experiencing a possible issue, whether the part has experienced a failure, whether the part is predicted to experience a possible issue in a period of time, whether the part is predicted to experience a failure in a period of time, a remaining useful life of the part, an amount of wear and tear the part has experienced, and/or the like based on the operations data (e.g., based on a trend and/or pattern in the operations data that the machine learning model has been trained to identify), based on operating condition data (e.g., to account for an effect that operating conditions may have on operations of the part), and/or the like. Additionally, or alternatively, the machine learning model may output a recommended operation to be performed with respect to the part and/or scheduling of the operation (e.g., maintenance, replacement, servicing, inspection, and/or the like), as described in more detail elsewhere herein.

In some implementations, the failure detection device may identify a machine learning model to use. For example, the failure detection device may store various machine learning models, and the failure detection device may identify a particular machine learning model to use to process the operations data. In some implementations, the failure detection device may identify a machine learning model based on information that identifies a type of the part for which the operations data was gathered and/or a type of sensor that gathered the operations data. For example, different machine learning models may be associated with different types of parts (e.g., different machine learning models for spark plugs, turbine inlets, or exhaust ports), different manufacturers of parts and/or sensors, different materials from which parts can be fabricated (e.g., aluminum, steel, plastic, and/or the like), different sensitivities of sensors, and/or the like.

Additionally, or alternatively, the failure detection device may identify a machine learning model based on a location of a part and/or a sensor. For example, the failure detection device may use a different machine learning model for a part and/or a sensor that is located internally to a machine 104 versus a part and/or sensor that is located externally to the machine 104. Additionally, or alternatively, the failure detection device may identify a machine learning model based on processing that the failure detection device performed on the operations data. For example, the failure detection device may select a machine learning model when using operations data to detect a possible issue in operations of a part, but may select a different machine learning model when using derived data to detect a possible issue in operations of a part. Similarly, in some implementations, the failure detection device may select different machine learning models for different data included in the operations data (e.g., different machine learning models for voltage data, temperature data, and/or the like), based on a time period during which the operations data was gathered and/or aggregated, and/or the like.

In some implementations, the failure detection device may perform an initial analysis of the operations data prior to selecting a machine learning model. For example, the failure detection device may analyze a trend, may analyze a pattern, may determine whether the operations data satisfies a threshold during a time period, and/or the like, prior to selecting a machine learning model to use, prior to determining to generate derived data, prior to determining to generate mapped data, and/or the like. In some implementations, the failure detection device may select a machine learning model based on whether the initial analysis indicates a possible issue with a part, a threshold remaining useful life of the part, a failure of the part, a threshold amount of wear and tear on the part, and/or the like, and the failure detection device may use the machine learning model to confirm results of the initial analysis.

This conserves processing resources by reducing or eliminating a need for the failure detection device to process the operations data if a result of an initial analysis does not indicate an issue (e.g., an existing issue or impending issue) with operation of a part, a threshold remaining useful life of the part, a failure (e.g., actual failure or impending failure) of the part, a threshold amount of wear and tear on the part, and/or the like. In addition, this increases an accuracy of processing the operations data utilizing a machine learning model by facilitating selection of a machine learning model that has been specifically trained to identify different aspects of operation of a part, which can improve an accuracy of determining a remaining useful life of the part. Further, using a machine learning model facilitates processing of thousands, millions, or more data elements for dozens, hundreds or more parts across dozens, hundreds, or more machines 104 in real-time or near real-time in a manner not previously possible.

In this way, the failure detection device may detect a possible issue with operations of a part of a machine based on analyzing mapped data (e.g., a pattern of mapped data, values of mapped data within a time period, and/or the like). For example, the failure detection device may detect a possible issue based on interpreting derived data that has been mapped to binary values to reduce noise associated with the derived data, to transform the derived data into a form that is easier to process by the failure detection platform, and/or the like.

As shown by reference number 124, the failure detection device may perform one or more actions. For example, the failure detection device may perform one or more actions after detecting that a set of conditions is satisfied (e.g., by operations data and/or derived data), after detecting a possible issue, and/or the like. In some implementations, an action may be related to addressing the possible issue, modifying operations of a machine 104 based on the possible issue, and/or the like.

In some implementations, the failure detection device may trigger an alarm that indicates a presence of a possible issue with operations of a part. For example, the failure detection device may send a message to a client device and/or an on-board system of a machine 104 for display that indicates a presence of the possible issue, may activate an output component (e.g., a light, a speaker, a vibration component, and/or the like) of the machine 104 and/or the client device, may send a set of instructions to a server device to populate an electronic account with information that indicates the presence of the possible issue, and/or the like.

Additionally, or alternatively, the failure detection device may determine a manner in which to modify operations of a machine 104 and may provide a set of instructions to the machine 104 to modify the operations of the machine 104. For example, the failure detection device may use a machine learning model to process information related to the possible issue in order to determine a manner in which to modify the operations of the machine 104, may perform a lookup of information that identifies the possible issue in a data structure that includes information identifying various possible issues and corresponding manners in which to modify operations of the machine 104, and/or the like, in order to identify a manner in which to modify operations of the machine 104. As specific examples, the failure detection device may determine to reduce an engine speed of a machine 104, to stop an engine of the machine 104, to power down a part of the machine 104, to power on a back-up part of the machine 104, to limit the machine 104 to a quantity of operating hours per day, per week, and/or the like, to limit an amount of load the machine 104 can receive per day, per week, and/or the like, and/or the like, based on a condition (or a combination of conditions) being satisfied, based on a possible issue (or a combination of possible issues) being detected, and/or the like.

In some implementations, the failure detection device may determine a maintenance facility at which the possible issue is to be addressed and/or a time by which the possible issue is to be addressed (e.g., a maintenance facility may include a location where maintenance activities, repair activities, inspection activities, and/or the like are performed). For example, the failure detection device may determine the maintenance facility and/or the time based on a severity of the possible issue (e.g., the failure detection device may identify a closer maintenance facility and/or a closer time for a more severe possible issue), the possible issue (e.g., particular maintenance facilities may only be capable of addressing particular types of possible issues and/or at particular times), an availability of the maintenance facility for the machine 104, and/or the like. Continuing with the previous example, the failure detection device may determine an availability of a maintenance facility and/or a time using an electronic calendar associated with the maintenance facility, using an electronic schedule of maintenance at a maintenance facility, and/or the like.

In some implementations, the failure detection device may schedule a machine 104 for maintenance at a particular maintenance facility and/or for a particular time. For example, the failure detection device may generate a calendar item on an electronic calendar, on an electronic schedule, and/or the like for maintenance at a particular maintenance facility to schedule the machine 104 for the maintenance. In some implementations, the failure detection device may send a set of instructions to the machine 104 to cause the machine 104 to move to the maintenance facility at the scheduled time (e.g., the set of instructions may cause a part of the machine 104 to be activated at the time to move the machine 104, may include a set of directions to the maintenance facility and/or information that identifies a location of the maintenance facility, and/or the like).

Additionally, or alternatively, the failure detection device may schedule a technician, a mechanic, and/or the like to be deployed to a location of the machine 104 and may cause the technician, the mechanic, and/or the like to be deployed to the location. For example, the failure detection device may select and/or schedule the technician, the mechanic, and/or the like in a manner similar to that described for a maintenance facility, and may send a message to a client device associated with the technician, the mechanic, and/or the like to dispatch the technician, the mechanic, and/or the like to a location of the machine 104.

In some implementations, the failure detection device may send a set of instructions to the machine 104 to cause an on-board system of the machine 104 to perform a diagnostic test of one or more parts of the machine 104. For example, the set of instructions may cause the machine 104 to perform a diagnostic test of a spark plug, a turbine inlet, an exhaust port, and/or the like.

As indicated above, FIGS. 1-3 are provided as one or more examples. Other examples may differ from what is described in connection with FIGS. 1-3.

Figure 4:
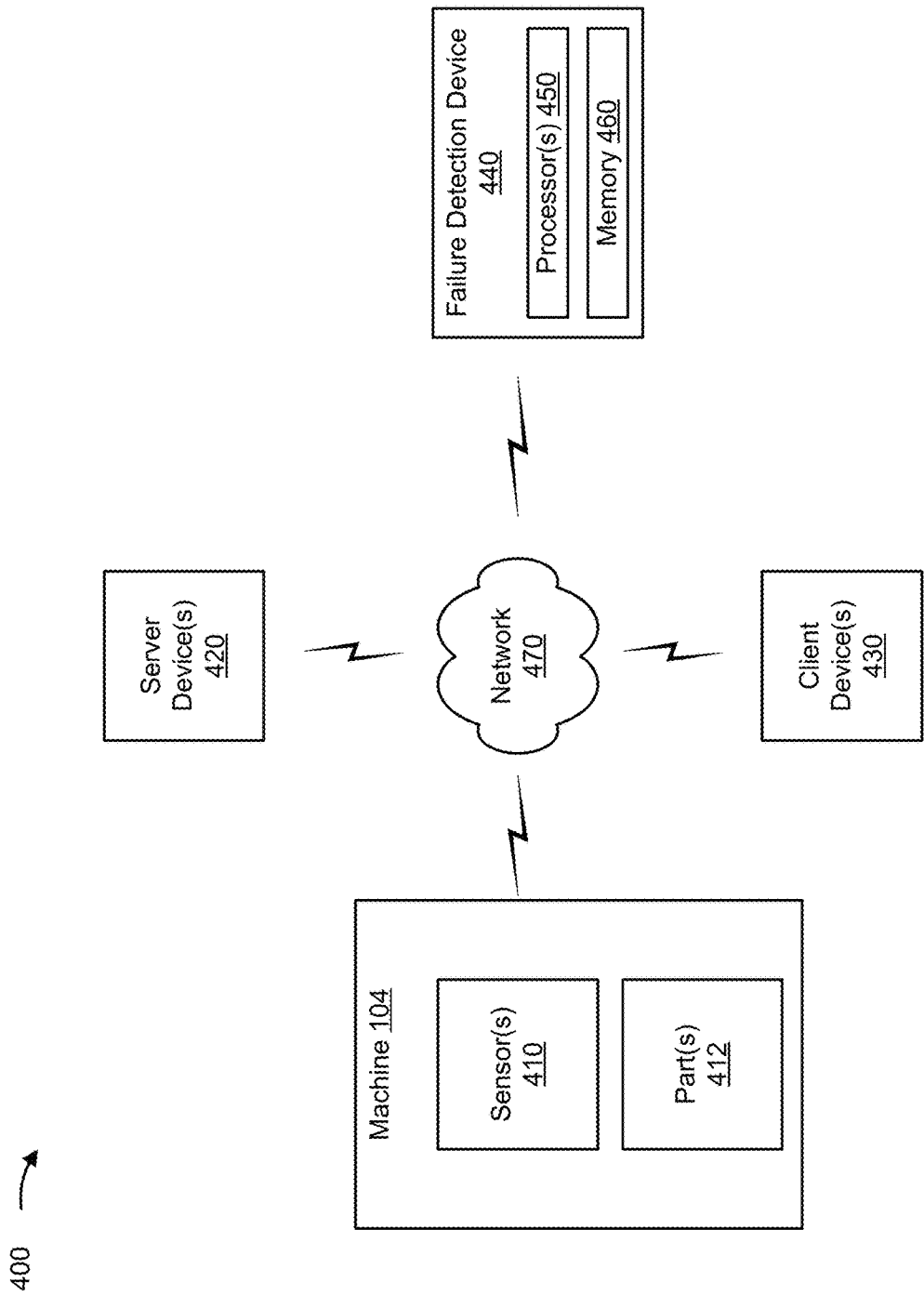
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a set of sensors 410 associated with a set of parts 412 of a machine 104, a set of server devices 420, a set of client devices 430, a failure detection device 440 that includes a set of processors 450 and memory 460, and a network 470.

Devices of environment 400 may interconnect via wired connections, wireless connections, or a combination of wired and wireless connections.

A sensor 410 includes a set of sensor devices that provide information regarding operations of a part 412 of a machine 104 (e.g., operations data) and/or operating conditions of the machine 104 (e.g., operating condition data). For example, the sensor 410 may include a temperature sensor, a voltage sensor, a vibration sensor, an engine speed sensor, an altitude sensor, and/or the like. In some implementations, a sensor 410 may gather operations data of a part 412 (e.g., a spark plug, a turbine inlet, an exhaust port, and/or the like) and may provide the operations data to the failure detection device 440, as described elsewhere herein.

A server device 420 includes one or more devices capable of receiving, generating, storing, processing, and/or providing operations data and/or operating condition data. For example, a server device 420 may include a server (e.g., in a data center or a cloud computing environment), a data center (e.g., a multi-server micro datacenter), a workstation computer, a virtual machine (VM) provided in a cloud computing environment, or a similar type of device. In some implementations, a server device 420 may include a communication interface that allows the server device 420 to receive information from and/or transmit information to other devices in environment 400. In some implementations, a server device 420 may be a physical device implemented within a housing, such as a chassis. In some implementations, a server device 420 may be a virtual device implemented by one or more computer devices of a cloud computing environment or a data center. In some implementations, a server device 420 may store operations data and/or operating condition data, may store a result of an analysis of the operations data and/or the operating condition data by the failure detection device 440, and/or the like, as described elsewhere herein.

A client device 430 includes one or more devices capable of receiving, generating, storing, processing, and/or providing operations data and/or operating condition data. For example, a client device 430 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, a client device 430 may receive, from the failure detection device 440, a result of an analysis of operations data and/or operating condition data performed by the failure detection device 440, as described elsewhere herein.

The failure detection device 440 includes one or more devices capable of receiving, generating, processing, storing, and/or providing operations data and/or operating condition data. For example, the failure detection device may be hosted on a set of server devices 420 deployed in a data center or in a cloud computing environment, may be hosted on a client device 430, may be hosted by an on-board system of the machine 104, and/or the like. In some implementations, the failure detection device 440 may process operations data and/or operating condition data to detect a possible issue with operations of a part 412 of a machine 104, as described elsewhere herein.

The failure detection device 440 includes a set of processors 450 (e.g., a microprocessor, a microcontroller, a field-programmable gate array (FPGA), an application-specific integrated circuit (ASIC), and/or the like) and a memory 460 (e.g., read-only memory (ROM), random-access memory (RAM), and/or the like). A processor 450 may execute one or more instructions and/or commands to control operations of the failure detection device 440, such as to detect a possible issue with operations of a part 412 of a machine 104. The memory 460 may store program code for execution by the processor 450 and/or for storing data in connection with execution of such program code by the processor 450.

Network 470 includes one or more wired and/or wireless networks. For example, the network 470 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

FIG. 5 is a flow chart of an example process 500 for detecting an issue or a potential issue with a part of a machine. In some implementations, one or more process blocks of FIG. 5 may be performed by a failure detection device (e.g., a failure detection device 440). In some implementations, one or more process blocks of FIG. 5 may be performed by another device or a group of devices separate from or including a failure detection device, such as a sensor (e.g., a sensor 410), a part (e.g., a part 412) of a machine 104, a server device (e.g., a server device 420), and a client device (e.g., a client device 430.

As shown in FIG. 5, process 500 may include receiving operations data related to operations of a set of parts of a machine, wherein the operations data is received from a set of sensors associated with the set of parts (block 510). For example, the failure detection device (e.g., using a processor 450, a memory 460, and/or the like) may receive operations data related to operations of a set of parts of a machine, as described above. In some implementations, the operations data is received from a set of sensors associated with the set of parts.

As further shown in FIG. 5, process 500 may include processing, after receiving the operations data, the operations data using a condition-based processing technique, wherein the condition-based processing technique is associated with mapping initial values of data elements of the operations data to binary values based on satisfaction of a first set of conditions by the initial values (block 520). For example, the failure detection device (e.g., using a processor 450, a memory 460, and/or the like) may process, after receiving the operations data, the operations data using a condition-based processing technique, as described above. In some implementations, the condition-based processing technique is associated with mapping initial values of data elements of the operations data to binary values based on satisfaction of a first set of conditions by the initial values.

As further shown in FIG. 5, process 500 may include detecting, after processing the operations data, a presence of a possible issue with the operations of the set of parts based on a second set of conditions, associated with the binary values and the initial values, being satisfied during a time period (block 530). For example, the failure detection device (e.g., using a processor 450, a memory 460, and/or the like) may detect, after processing the operations data, a presence of a possible issue with the operations of the set of parts based on a second set of conditions, associated with the binary values and the initial values, being satisfied during a time period, as described above.

As further shown in FIG. 5, process 500 may include performing, after detecting the presence of the possible issue, a set of actions related to addressing the possible issue, wherein the set of actions includes an action related to causing the presence of the possible issue to be addressed (block 540). For example, the failure detection device (e.g., using a processor 450, a memory 460, and/or the like) may perform, after detecting the presence of the possible issue, a set of actions related to addressing the possible issue, as described above. In some implementations, the set of actions includes an action related to causing the presence of the possible issue to be addressed.

Process 500 may include additional implementations, such as any single implementation or any combination of implementations described below and/or in connection with one or more other processes described elsewhere herein.

In some implementations, the failure detection device may identify, after detecting the presence of the possible issue, a particular part, of the set of parts, associated with the possible issue, and may send, after identifying the presence of the possible issue, a message to a robot or to a client device associated with an individual, wherein the message includes information that identifies the particular part. In some implementations, the failure detection device may determine, from an on-board system of the machine and after receiving the operations data, that an engine associated with the machine is operating, and may process the operations data after determining that the engine associated with the machine is operating.

In some implementations, the failure detection device may send, after detecting the presence of the possible issue, a set of instructions to the on-board system to perform a diagnostic inspection of the operations of the set of parts. In some implementations, the failure detection device may trigger, after detecting the presence of the possible issue, an alarm that indicates the presence of the possible issue by triggering at least one of: an output component associated with the machine, or a notification to be provided for display via a display associated with the on-board system. In some implementations, the failure detection device may process, after receiving the operations data, the operations data using a pre-processing technique, wherein the pre-processing technique includes applying a function to the operations data to modify the initial values of the data elements to reduce noise associated with the initial values of the data elements, and may process the operations data using the condition-based processing technique after processing the operations data using the pre-processing technique.

Additionally, or alternatively, a process described herein may include receiving operations data related to operations of one or more of a set of parts of a machine, wherein the operations data is received from a set of sensors associated with the set of parts. For example, the failure detection device (e.g., using a processor 450, a memory 460, and/or the like) may receive operations data related to operations of a set of parts of a machine, as described above. In some implementations, the operations data is received from a set of sensors associated with the set of parts.

Such as process may include processing, after receiving the operations data, the operations data using a condition-based processing technique, wherein the condition-based processing technique is associated with mapping initial values of data elements of the operations data to mapped values based on satisfaction of a set of conditions by the initial values. For example, the failure detection device (e.g., using a processor 450, a memory 460, and/or the like) may process, after receiving the operations data, the operations data using a condition-based processing technique, as described above. In some implementations, the condition-based processing technique is associated with mapping initial values of data elements of the operations data to mapped values based on satisfaction of a set of conditions by the initial values.

Such a process may include detecting, after processing the operations data, a presence of a possible issue with the operations of one or more of the set of parts based on a condition, associated with the mapped values, being satisfied a threshold quantity of times during a time period. For example, the failure detection device (e.g., using a processor 450, a memory 460, and/or the like) may detect, after processing the operations data, a presence of a possible issue with the operations of one or more of the set of parts based on a condition, associated with the mapped values, being satisfied a threshold quantity of times during a time period, as described above.

Such a process may include triggering, based on detecting the presence of the possible issue, an alarm that indicates the presence of the possible issue with the operations of the one or more of the set of parts. For example, the failure detection device (e.g., using processor 450, a memory 460, and/or the like) may trigger, based on detecting the presence of the possible issue, an alarm that indicates the presence of the possible issue with the operations of the one or more of the set of parts, as described above.

Such a process may include performing, based on triggering the alarm that indicates the presence of the possible issue, a set of actions related to addressing the possible issue. For example, the failure detection device (e.g., using processor 450, memory 460, and/or the like) may perform, based on triggering the alarm that indicates the presence of the possible issue, a set of actions related to addressing the possible issue, as described above.

Such a process may include additional implementations, such as any single implementation or any combination of implementations described below and/or in connection with one or more other processes described elsewhere herein.

In some implementations, the failure detection device may determine a manner in which to modify operations of the machine, and may provide, to the machine and after determining the manner in which to modify the operations of the machine, a set of instructions associated with modifying the operations of the machine. In some implementations, the operations data includes at least one of: a voltage measurement for a spark plug associated with an engine of the machine, a temperature measurement for a turbine inlet of a turbine of the machine, or a temperature measurement for an exhaust port of an exhaust system of the machine.

In some implementations, the failure detection device may receive operating condition data related to a set of operating conditions of the machine, and may detect the presence of the possible issue based on detecting that the condition is satisfied the threshold quantity of times during the time period in a context of the operating condition data. In some implementations, the failure detection device may activate an output component, associated with the machine, that indicates the presence of the possible issue, or send a message to a client device for display, wherein the message includes information that indicates the presence of the possible issue.

In some implementations, the failure detection device may determine, after detecting the presence of the possible issue, a severity of the possible issue based on the condition, the threshold quantity, or the mapped values. In some implementations, the failure detection device may determine, based on the severity of the possible issue, a maintenance facility at which the possible issue is to be addressed, may schedule, for a particular time and after determining the severity, the machine for maintenance at the maintenance facility, and may send, after scheduling the machine for the maintenance, a set of instructions to the machine to cause the machine to move to the maintenance facility at the particular time.

Additionally, or alternatively, a process described herein may include receiving operations data related to operations of a set of spark plugs, wherein the operations data is received from the set of sensors associated with the set of spark plugs. For example, the failure detection device (e.g., using a processor 450, a memory 460, and/or the like) may receive operations data related to operations of the set of spark plugs, as described above. In some implementations, the operations data is received from the set of sensors associated with the set of spark plugs.

Such a process may include processing, after receiving the operations data, the operations data using a pre-processing technique to form derived data, wherein the pre-processing technique is associated with reducing noise associated with the operations data, as described above. For example, the failure detection device (e.g., using a processor 450, a memory 460, and/or the like) may process, after receiving the operations data, the operations data using a pre-processing technique to form derived data, as described above. In some implementations, the pre-processing technique is associated with reducing noise associated with the operations data.

Such a process may include processing, after processing the operations data, the derived data using a condition-based processing technique, wherein the condition-based processing technique is associated with assigning mapped values to data elements of the derived data based on whether initial values for the data elements satisfy a threshold. For example, the failure detection device (e.g., using a processor 450, a memory 460, and/or the like) may process, after processing the operations data, the derived data using a condition-based processing technique, as described above. In some implementations, the condition-based processing technique is associated with assigning mapped values to data elements of the derived data based on whether initial values for the data elements satisfy a threshold.

Such a process may include detecting, after processing the derived data, a presence of a possible issue with the set of spark plugs based on a condition, associated with the mapped values, being satisfied a threshold quantity of times during a time period. For example, the failure detection device (e.g., using a processor 450, a memory 460, and/or the like) may detect, after processing the derived data, a presence of a possible issue with the set of spark plugs based on a condition, associated with the mapped values, being satisfied a threshold quantity of times during a time period, as described above.

Such a process may include performing, after detecting the presence of the possible issue, a set of actions related to addressing the possible issue. For example, the failure detection device (e.g., using a processor 450, a memory 460, and/or the like) may perform, after detecting the presence of the possible issue, a set of actions related to addressing the possible issue, as described above.

Such a process may include additional implementations, such as any single implementation or any combination of implementations described below and/or in connection with one or more other processes described elsewhere herein.

In some implementations, the failure detection device may process the derived data using a binary condition-based processing technique to map the derived data to binary values based on whether voltage measurements for the set of spark plugs satisfy the threshold, wherein the voltage measurements are identified in the derived data. In some implementations, the failure detection device may determine, after processing the derived data using the binary condition-based processing technique, that a particular binary value, of the binary values, has occurred the threshold quantity of times during the time period, may determine, after determining that the particular binary value has occurred the threshold quantity of times during the time period, that the initial values of the operations data satisfy another threshold for a portion of the time period, and may detect the presence of the possible issue after determining that the initial values of the derived data satisfy the other threshold for the portion of the time period.

In some implementations, the failure detection device may trigger, after detecting the presence of the possible issue, an alarm that indicates the presence of the possible issue, and may perform the set of actions after triggering the alarm. In some implementations, the failure detection device may process the operations data by at least one of: applying a same value to the initial values of the data elements, or modifying the initial values of the data elements using a function.

In some implementations, the failure detection device may provide, to the machine and after detecting the presence of the possible issue, a set of instructions associated with causing the machine to perform a diagnostic test of the operations of the set of spark plugs. In some implementations, the failure detection device may identify a particular spark plug, of the set of spark plugs, associated with the presence of the possible issue, and may perform the set of actions after identifying the particular spark plug.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The disclosed failure detection device (e.g., a failure detection device 440) may be used with any machine (e.g., a machine 104) where a technique for detecting an issue with a part (e.g., a part 412) of the machine is needed. The disclosed failure detection device may process operations data to transform the operations data from a form output by a sensor to another form that is easier and/or more efficient for the failure detection device to process when detecting an issue with the operations data. This conserves processing resources that would otherwise be consumed attempting to detect an issue with a part of a machine from operations data that includes a significant amount of noise (e.g., operations data that includes a large range of values within a time period). In addition, transforming the operations data facilitates faster detection of a possible issue with operations of a part of a machine relative to processing un-transformed operations data by separating values of the operations data, by reducing a range of discrete values, and/or the like.

The conservation of processing resources and/or time resulting from operations of the failure detection device may facilitate faster detection and/or addressing of a possible issue with operations of a part of a machine. This provides the failure detection device with a capability to prevent a possible issue isolated to a particular part of the machine from impacting other parts of the machine, from causing a breakdown of the machine, and/or the like, which improve operations of the machine, conserve costs and/or time associated with a breakdown of the machine, and/or the like. Further, early detection of a possible issue facilitates performance of preventive maintenance on a machine, which increases an operating life of the machine by preventing more severe issues from occurring with respect to operations of the machine. Further, the failure detection device may detect possible issues with operations of a part of a machine in a context of operating conditions of the machine (e.g., as operating conditions change during operation of the machine). This reduces or eliminates false positive detection of a possible issue, which consumes processing resources, time, and/or the like associated with detecting a possible issue.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A device associated with a machine that includes a set of spark plugs and a set of sensors associated with the set of spark plugs, the device comprising:
   a memory; and
   one or more processors configured to:
      receive operations data related to operations of the set of spark plugs,
         wherein the operations data is received from the set of sensors associated with the set of spark plugs;
      process, after receiving the operations data, the operations data using a pre-processing technique to form derived data,
         wherein the pre-processing technique is associated with reducing noise associated with the operations data;
      process, after processing the operations data, the derived data using a condition-based processing technique,
         wherein the condition-based processing technique is associated with assigning mapped values to data elements of the derived data based on whether initial values for the data elements satisfy a threshold;
      detect, after processing the derived data, a presence of a possible issue with the set of spark plugs based on a condition, associated with the mapped values, being satisfied a threshold quantity of times during a time period; and
      perform, after detecting the presence of the possible issue, a set of actions related to addressing the possible issue.

2. The device of claim 1, wherein the one or more processors, when processing the derived data using the condition-based processing technique, are configured to:
   process the derived data using a binary condition-based processing technique to map the derived data to binary values based on whether voltage measurements for the set of spark plugs satisfy the threshold,
      wherein the voltage measurements are identified in the derived data.

3. The device of claim 2, wherein the one or more processors are further configured to:
   determine, after processing the derived data using the binary condition-based processing technique, that a particular binary value, of the binary values, has occurred the threshold quantity of times during the time period;
   determine, after determining that the particular binary value has occurred the threshold quantity of times during the time period, that the initial values of the operations data satisfy another threshold for a portion of the time period; and
   wherein the one or more processors, when detecting the presence of the possible issue, are configured to:
      detect the presence of the possible issue after determining that the initial values of the derived data satisfy the other threshold for the portion of the time period.

4. The device of claim 1, wherein the one or more processors are further configured to:
   trigger, after detecting the presence of the possible issue, an alarm that indicates the presence of the possible issue; and
   wherein the one or more processors, when performing the set of actions, are configured to:
      perform the set of actions after triggering the alarm.

5. The device of claim 1, wherein the one or more processors, when processing the operations data using the pre-processing technique, are configured to:
   process the operations data by at least one of:
      applying a same value to the initial values of the data elements, or
      modifying the initial values of the data elements using a function.

6. The device of claim 1, wherein the one or more processors, when performing the set of actions, are configured to:
   provide, to the machine and after detecting the presence of the possible issue, a set of instructions associated with causing the machine to perform a diagnostic test of the operations of the set of spark plugs.

7. The device of claim 1, wherein the one or more processors are further configured to:
- identify a particular spark plug, of the set of spark plugs, associated with the presence of the possible issue; and
- wherein the one or more processors, when performing the set of actions, are configured to:
  - perform the set of actions after identifying the particular spark plug.

* * * * *